United States Patent
Serebrin et al.

(10) Patent No.: US 9,552,293 B1
(45) Date of Patent: Jan. 24, 2017

(54) EMULATING EVICTION DATA PATHS FOR INVALIDATED INSTRUCTION CACHE

(75) Inventors: Benjamin Charles Serebrin, Sunnyvale, CA (US); David Levinthal, Los Gatos, CA (US); Kevin D. Kissell, Menlo Park, CA (US); Clinton Wills Smullen, IV, Sunnyvale, VA (US)

(73) Assignee: Google Inc., Mountain View, CA (US)

( * ) Notice: Subject to any disclaimer, the term of this patent is extended or adjusted under 35 U.S.C. 154(b) by 790 days.

(21) Appl. No.: 13/567,206

(22) Filed: Aug. 6, 2012

(51) Int. Cl.
   *G06F 12/00* (2006.01)
   *G06F 12/08* (2016.01)

(52) U.S. Cl.
   CPC ....... *G06F 12/0802* (2013.01); *G06F 12/0811* (2013.01); *G06F 12/0862* (2013.01)

(58) Field of Classification Search
   USPC ......................................................... 711/122
   See application file for complete search history.

(56) References Cited

U.S. PATENT DOCUMENTS

| | | | |
|---|---|---|---|
| 6,401,192 B1 * | 6/2002 | Schroter et al. ............. | 712/207 |
| 6,446,143 B1 | 9/2002 | Razdan et al. | |
| 6,725,341 B1 * | 4/2004 | Peir ..................... | G06F 12/0831 |
| | | | 711/117 |
| 7,281,092 B2 | 10/2007 | Rajamony et al. | |
| 7,831,771 B2 * | 11/2010 | Degenaro et al. ............ | 711/118 |
| 2006/0143396 A1 | 6/2006 | Cabot | |
| 2006/0212654 A1 | 9/2006 | Balakrishnan | |
| 2007/0094450 A1 | 4/2007 | VanderWiel | |
| 2010/0262784 A1 | 10/2010 | Guthrie et al. | |
| 2011/0010501 A1 * | 1/2011 | Glover et al. ................ | 711/122 |
| 2011/0072218 A1 | 3/2011 | Manne et al. | |
| 2012/0072652 A1 | 3/2012 | Celis et al. | |
| 2012/0124291 A1 | 5/2012 | Achilles et al. | |
| 2012/0246446 A1 * | 9/2012 | Solihin ......................... | 712/205 |
| 2013/0246708 A1 * | 9/2013 | Ono ..................... | G06F 12/0862 |
| | | | 711/122 |
| 2014/0156932 A1 * | 6/2014 | Dundas ......................... | 711/122 |

\* cited by examiner

*Primary Examiner* — Jared Rutz
*Assistant Examiner* — Hamdy S Ahmed
(74) *Attorney, Agent, or Firm* — Honigman Miller Schwartz and Cohn LLP

(57) ABSTRACT

A method of managing processor caches. The method includes invalidating a cache line from a first instruction cache level and in response to invalidating the cache line from the first cache level, fetching data associated with the invalidated cache line from a third cache level or memory and writing the fetched data to a second cache level. The third cache level is larger or differently associative than the second cache level and the second cache level is larger or differently associative than the first cache level.

30 Claims, 6 Drawing Sheets

EMULATING EVICTION DATA PATHS FOR INVALIDATED INSTRUCTION CACHE

TECHNICAL FIELD

This disclosure relates to emulating an eviction data path for invalidated instruction cache.

BACKGROUND

A computing system typically includes a central processing unit (CPU) (also referred to as a processor) and supporting hardware necessary to store, retrieve, and transfer information, such as communications buses and memory. The computing system may also include hardware for external communications, such as input/output controllers or storage controllers, and devices attached thereto such as keyboards, monitors, tape drives, disk drives, communication lines coupled to a network, etc. The CPU may execute instructions of a computer program to direct operation of other system components.

Computing systems typically include storage devices in communication with the processor for storing data. Storage devices used for storing mass data generally have relatively long latency time to access data stored thereon. If a processor were to access data directly from such a mass storage device every time it performed an operation, it would spend nearly all of its time waiting for the storage device to return the data, and its throughput would be very low. As a result, computer systems typically store data in a hierarchy of memory or storage devices, each succeeding level having faster access, but storing less data. At the highest level is the mass storage unit or units, which store all the data on relatively slow devices. Moving down the hierarchy is a main memory, which is generally semiconductor memory. Main memory has a much smaller data capacity than the storage units, but a much faster access. Lower still are caches, which may be at a single level, or multiple levels (level 1 being the lowest), of the hierarchy. Caches are typically also semiconductor memory, but are faster than main memory, and again have a smaller data capacity.

Due to the fixed size of a cache, it generally must remove or evict data to make room for newly received data. Often, the data selected for removal will be referenced again soon afterwards. In particular, where the cache is designed using associativity sets, another cache line in the same associativity set must be selected for removal. If a particular associativity set contains frequently referenced cache lines (referred to as a "hot" associativity set), it is likely that the evicted cache line will be needed again soon.

Some multi-level caches use a "victim cache," which is typically an intermediate cache level that receives all evicted cache lines from a cache level immediately above it in the cache hierarchy. The victim cache may buffer evicted cache lines from a cache level before final eviction to memory. The victim cache may hold the buffered cache lines for a certain amount of time, allowing the cache system to bring the evicted cache lines back in before their final eviction.

SUMMARY

One aspect of the disclosure provides a method of managing processor caches. The method includes invalidating a cache line from a first cache level and in response to invalidating the cache line from the first cache level, fetching data associated with the invalidated cache line from a third cache level or memory and writing the fetched data to a second cache level. The third cache level is larger or differently associative than the second cache level and the second cache level is larger or differently associative than the first cache level.

The method repopulates cache lines in the second level cache without the need to build a full eviction path from the first cache level to the second cache level. In other words, the method can replace a traditional L1 cache eviction to the L2 cache, which uses a write port to the L2 cache. This not only increases performance by avoiding an instruction fetch, but decreases an implementation cost by not needing another write port.

Implementations of the disclosure may include one or more of the following features. In some implementations, the method includes sending a prefetch request having an address of the invalidated cache line from the first cache level to the second cache level along an address request path, such as a general address request path or a separate prefetch address request path. The general address request path accepts both prefetch requests and demand fetch requests, whereas the prefetch address request path only accepts prefetch requests (i.e., prohibits demand fetch requests from the first cache level). The method may include instantiating the prefetch address request path between the first and second cache levels. The second cache level prefetches the data corresponding to the cache line address from the third cache level or memory. The method may include executing the data fetch before incurring a cache miss for the data in the first cache level or the second cache level (e.g., by executing data fetch upon or soon after eviction of the cache line from the first cache level).

The prefetch request may include the address, a usage indicator, and/or a prefetch indicator signaling the second cache level to prefetch the data corresponding to the cache line address of the prefetch request from the third cache level or memory. The method may include executing the data fetch from the third cache level or memory based on a usage predictor. In some examples, execution of the data fetch occurs only when the invalidated cache line has a reference count greater than a threshold count.

Another aspect of the disclosure provides a computing system that includes a computing processor, cache in communication with the computing processor, and memory in communication with the cache and the computing processor. The cache includes a first cache level and a second cache level larger or differently associative than the first cache level. In response to the first cache level invalidating a cache line, the second cache level fetches data associated with the invalidated cache line from a third cache level of the cache or from memory. Moreover, the first level cache may invalidate a cache line and request a prefetch of that same cache line (e.g., since instruction caches do not modify their data contents).

In some implementations, the first cache level sends a prefetch request having an address of the invalidated cache line to the second cache level along an address request path, which may be either a general address request path or a separate prefetch address request path. The general address request path accepts both prefetch requests and demand fetch requests, whereas the prefetch address request path only accepts prefetch requests (i.e, prohibits demand fetch requests from the first cache level). The first cache level may instantiate the prefetch address request path between the first and second cache levels. In some examples, the first cache level sends demand fetch requests to the second cache level along a demand address request path, which is separate from the prefetch address request path.

In response to receiving the prefetch request, the second cache level prefetches the data corresponding to the cache line address from the third cache level or memory. The first cache level may send the prefetch request to the second cache level before incurring a cache miss for the data in the first or second cache levels.

The prefetch request may include the address, a usage indicator, and/or a prefetch indicator signaling the second cache level to prefetch the data corresponding to the cache line address of the prefetch request from the third cache level or memory. The first cache level may send the prefetch request based on the usage predictor, such as a reference count. In some examples, execution of the data fetch occurs only when the invalidated cache line has a reference count greater than a threshold count.

Yet another aspect of the disclosure provides a computer program product encoded on a non-transitory computer readable storage medium including instructions that when executed by a data processing apparatus cause the data processing apparatus to perform operations of a method. The method includes invalidating a cache line from a first cache level and in response to invalidating the cache line from the first cache level, fetching data associated with the invalidated cache line from a third cache level or memory and writing the fetched data to a second cache level. The third cache level is larger or differently associative than the second cache level and the second cache level is larger or differently associative than the first cache level.

The method repopulates cache lines in the second level cache without the need to build a full eviction path from the first cache level to the second cache level. In other words, the method can replace a traditional L1 cache eviction to the L2 cache, which uses a write port to the L2 cache. This not only increases performance by avoiding an instruction fetch, but decreases an implementation cost by not needing another write port.

Implementations of the disclosure may include one or more of the following features. In some implementations, the method includes sending a prefetch request having an address of the invalidated cache line from the first cache level to the second cache level along an address request path, such as a general address request path or a separate prefetch address request path. The general address request path accepts both prefetch requests and demand fetch requests, whereas the prefetch address request path only accepts prefetch requests (i.e, prohibits demand fetch requests from the first cache level). The method may include instantiating the prefetch address request path between the first and second cache levels. The second cache level prefetches the data corresponding to the cache line address from the third cache level or memory. The method may include executing the data fetch before incurring a cache miss for the data in the first cache level or the second cache level (e.g., by executing data fetch upon or soon after eviction of the cache line).

The prefetch request may include the address, a usage indicator, and/or a prefetch indicator signaling the second cache level to prefetch the data corresponding to the cache line address of the prefetch request from the third cache level or memory. The method may include executing the data fetch from the third cache level or memory based on a usage predictor. In some examples, execution of the data fetch occurs only when the invalidated cache line has a reference count greater than a threshold count.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
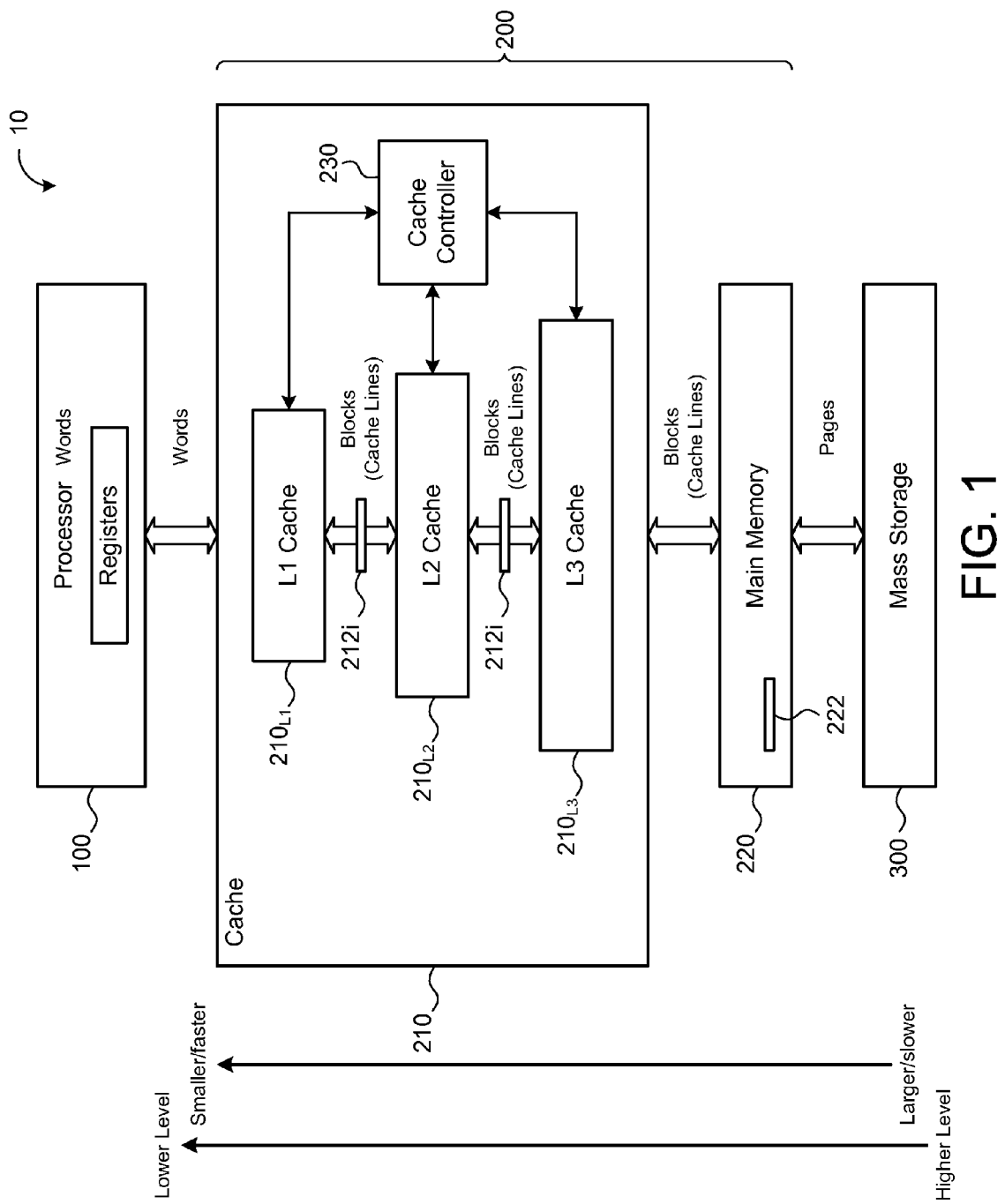
FIG. 1 is a schematic view of an exemplary computing system having cache and memory.

Referring to FIG. 1, in some implementations, a computing system 10 includes at least one computing processor 100 that executes instructions stored in memory 200. The memory 200 includes cache 210 and main memory 220. The cache 210 is a component that transparently stores data so that future requests for that data can be served faster. After generating a memory reference address, the processor 100 may look for the corresponding data first in cache 210 (which may require searches at multiple cache levels). If the data is not there (referred to as a "cache miss"), the processor 100 obtains the data from memory 220, or if necessary, from mass storage 300 (e.g., disk drive). Memory access may require a relatively large number of processor cycles, during which the processor 100 is generally idle. The processor(s) 100 may access the cache 210 to reduce an average memory access time. The cache 210 may be relatively smaller, faster memory, compared to the main memory 220 and mass storage 300, and stores copies of data from most frequently used main memory locations 222. As long as most memory accesses are for cached memory locations, the average latency of memory accesses will be closer to a cache latency than to a main memory latency. Moreover, causing the processor 100 to read from or write to the cache 210, rather than the corresponding location 222 in the main memory 220 can be much faster than reading from or writing to main memory 220 itself. However, since the capacity of the cache 210 may be only a small fraction of the capacity of main memory 220, which itself may be only a small fraction of the capacity of the mass storage 300, it is not possible to simply load all the data into the cache 210.

Figure 2:
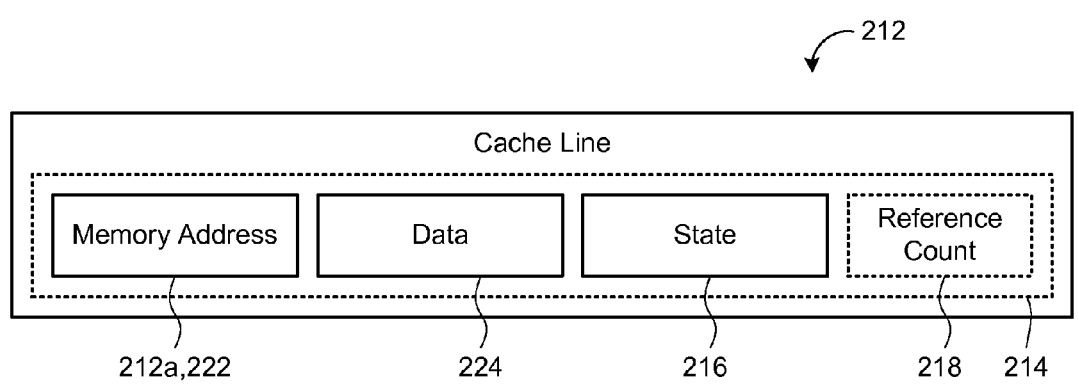
FIG. 2 is a schematic view of an exemplary cache line.

Referring to FIG. 2, the cache 210 may be divided into units of data called lines 212, a cache line being the smallest unit of data that can be independently loaded into the cache 210 or removed from the cache 210. Each cache line 212 may correspond to a main memory location 222, i.e., a physical memory address. A cache controller 230 may manage the cache 210. When copying memory to the cache 210, the cache controller 230 creates a cache entry 214 in the cache line 212 that may include: 1) the requested memory location 222 (e.g., a tag); and 2) a copy of the corresponding data 224. The cache entry 214 may include a state 216, such as modified/execute/shared/invalid/forward or modified/execute/owned/shared/invalid. In some examples, the cache entry 214 includes a reference count 218 as well. Every time the processor 100 accesses the memory location 222 of that cache line 212, the cache controller 230 increments the associated reference count 218. In some examples, the reference count 218 can be used as or replaced with a least recently used (LRU) attribute. The processor 100 may use the LRU attribute to discard the least recently used cache entry 214 or cache line 212 first.

When the processor 100 needs to read from or write to a location 222 in the main memory 220, the processor 100 may first check for a corresponding entry in the cache 210. The cache controller 230 checks for the contents of the requested memory location in any cache lines 212 that might contain that address. A "cache hit" occurs when the cache controller 230 finds the memory location 222 in the cache 210; otherwise, a "cache miss" occurs. In the case of a cache hit, the cache controller 230 returns the corresponding cache line 212 to the requester, in this case, the processor 100, which reads or writes data in the cache line 212. In the case of a cache miss, the cache controller 230 may allocate a new cache entry 214 and copy the data 224 from the main memory 220. The memory request can then be fulfilled from the contents of the cache 210.

The cache 210 may have multiple independent cache levels, such as L1, L2, L3 cache levels $210_{L1}$, $210_{L2}$, $210_{L3}$, with the L1 cache $210_{L1}$ being the lowest level cache and the L3 cache $210_{L3}$ being the last level cache (LLC). In some implementations, the L1 cache $210_{L1}$ is an instruction cache for speeding up executable instruction fetches and the L2 cache $210_{L2}$ and L3 cache $210_{L3}$ are data caches to speeding up data fetches and data stores. In implementations where the computing system 10 has multiple processors 100, each processor 100 may have a separate L1 cache $210_{L1}$ (instruction cache), while sharing common L2, L3 caches $210_{L2}$, $210_{L3}$ (data/instruction caches).

In some implementations, the L3 cache $210_{L3}$ is larger than the L2 cache $210_{L2}$, which is larger than the L1 cache $210_{L1}$. The cache 210 may have an L1 cache $210_{L1}$ of between 16-512 Kbyte, an L2 cache $210_{L2}$ of between 256-512 Kbyte, and an L3 cache $210_{L3}$ of between 512 Kbytes-4 Mbytes. The main memory 220 may have between 4 Mbyte and several Gbytes. Other sizes of cache 210 and main memory 220 are possible as well. In other implementations, the cache levels $210_{L1}$, $210_{L2}$, $210_{L3}$ are of any size and associativity.

The cache levels $210_{L1}$, $210_{L2}$, $210_{L3}$ may be inclusive (e.g., where all data in the L1 cache $210_{L1}$ must also be somewhere in the L2 cache $210_{L2}$), exclusive (e.g., where data is guaranteed to be in at most one of the L1 and L2 caches $210_{L1}$, $210_{L2}$), or an intermediate policy, where data in the L1 cache $210_{L1}$ is not required to reside in the L2 cache, but may. Moreover, the cache may have a replacement policy. The replacement policy indicates where to store a particular entry of main memory 220 in the cache 210. A fully associative replacement policy allows any cache line 212 to hold any memory location 222 of the main memory 22, whereas a direct mapped policy causes each cache line 212 to receive only on corresponding main memory location 222. An intermediate replacement policy allows storage of each main memory location 222 in any of N cache lines 212, which is generally known as N-way set associative.

Figure 3:
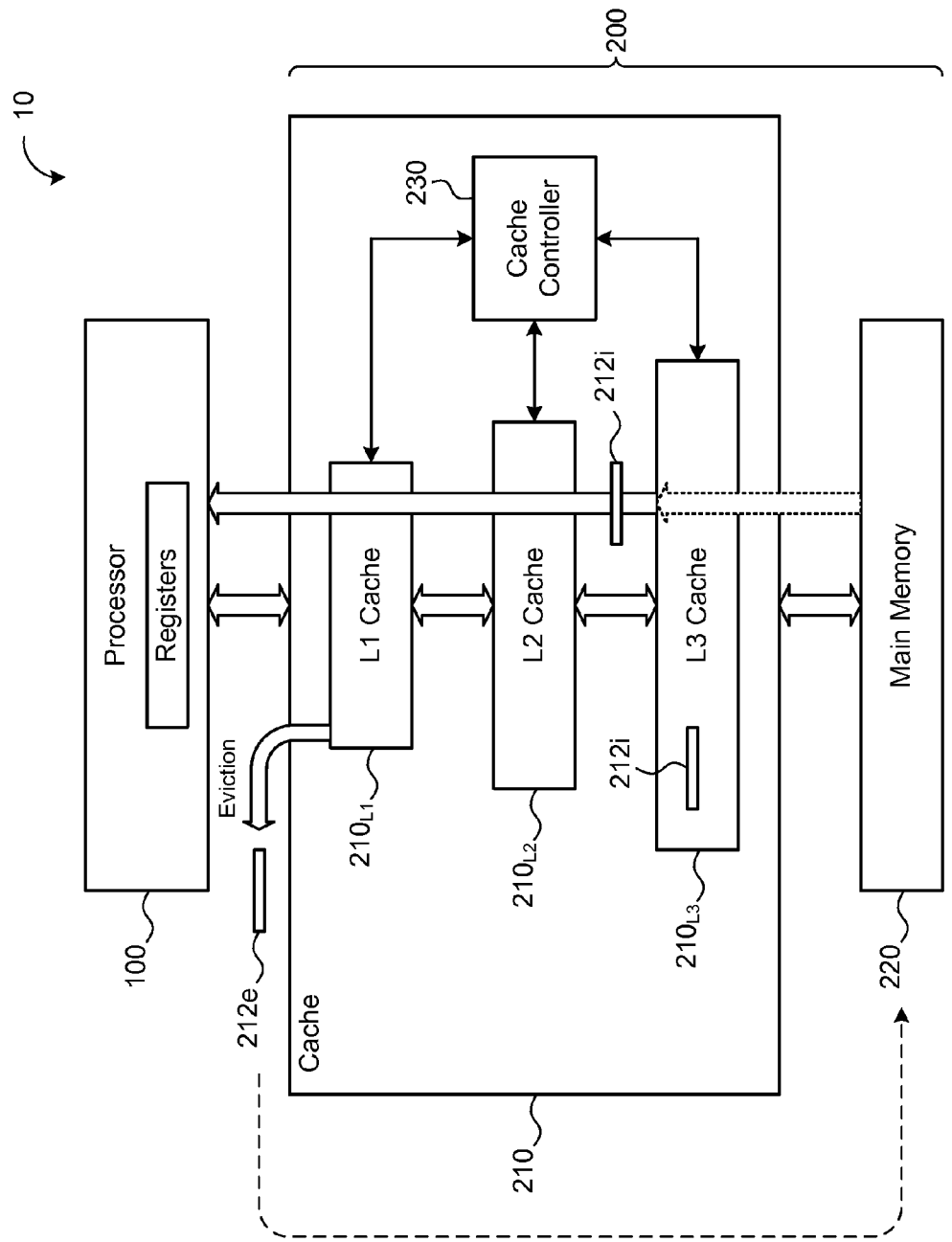
FIG. 3 is a schematic view of an exemplary computing system with a processor retrieving data from an L3 cache level or memory, where the data corresponds to an invalidated cache line from an L1 cache.
Figure 4:
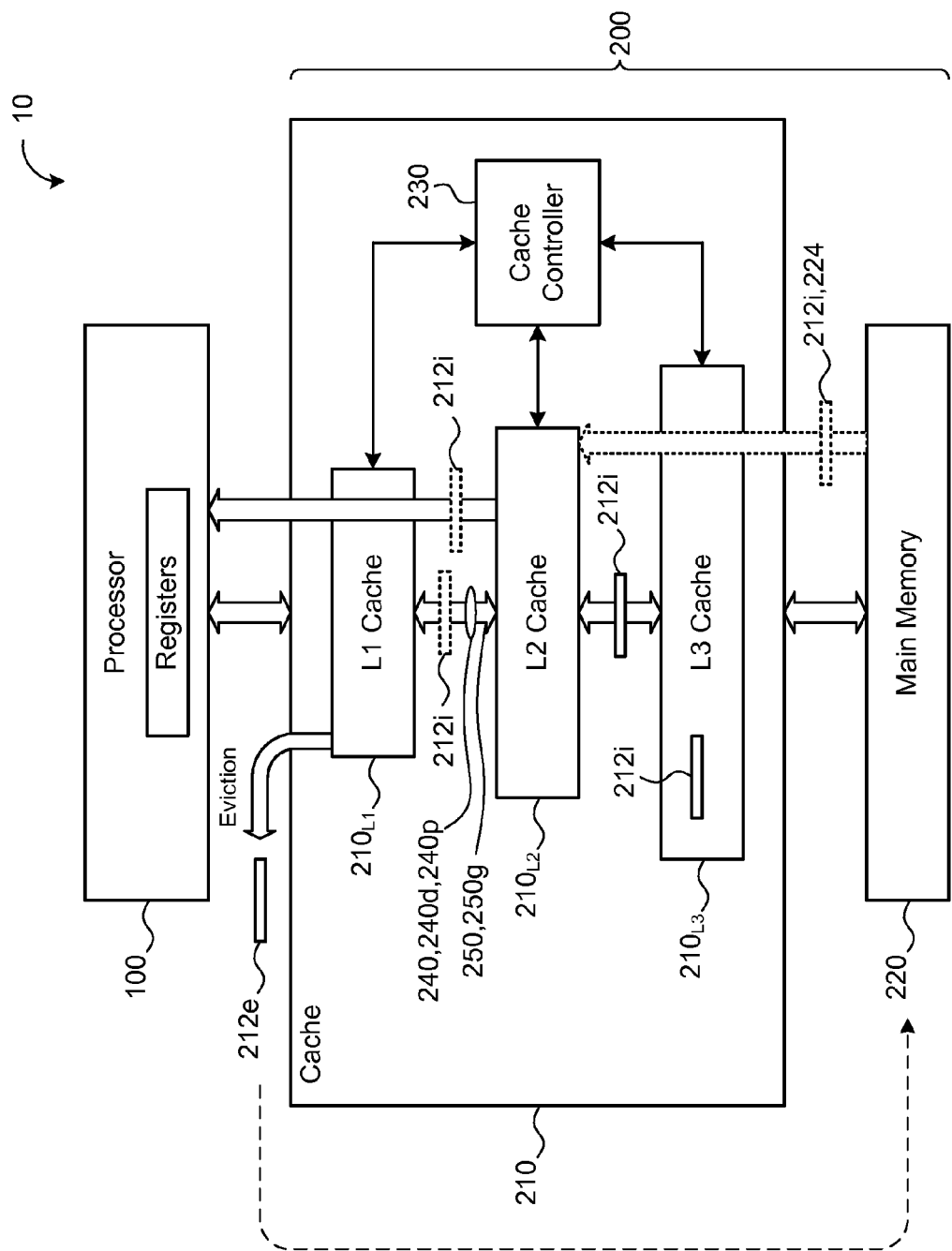
FIGS. 4 and 5 are schematic views of exemplary computing systems having an L1 cache sending a fetch request to an L2 to fetch data from an L3 cache level or memory, where the data corresponds to an invalidated cache line from an L1 cache

Referring to FIGS. 3 and 4, in some implementations, the computing processor 100 uses one or more of the L2, L3 data caches $210_{L2}$, $210_{L3}$ as additional instruction cache. The computing processor 100 may maintain coherency (i.e., consistency of the data) between the L1 instruction cache $210_{L1}$ and the L2, L3 data caches $210_{L2}$, $210_{L3}$ while not storing cache lines 212 of the L1 instruction cache $210_{L1}$ in any modified state. Moreover, the computing processor may evict invalidated instruction cache line(s) 212e from the L1 cache $210_{L1}$ without any write-backs to the L2 cache $210_{L2}$, which may cause the processor 100 to access the L3 cache $210_{L3}$ or memory hierarchy for an instruction fetch, resulting in a comparably longer memory access or instruction fetch stall. Fetching instructions from the L3 cache $210_{L3}$ can have at least a 55 cycle cost compared to fetching instructions from the L2 cache $210_{L2}$, which can have at least an 8 cycle cost. These cycle costs may vary depending on the system.

To avoid the instruction fetch from the L3 cache $210_{L3}$ and/or the need for a write port from the L1 cache $210_{L1}$ to the L2 cache $210_{L2}$, the cache controller 230 may fetch instructions (or data) associated with the invalidated cache line(s) 212e of the L1 cache $210_{L1}$ from the L3 cache $210_{L3}$ or memory 220 (or memory hierarchy) and write the fetched instructions to the L2 cache $210_{L2}$, as a result of a request from the L1 cache. The L1 cache $210_{L1}$ may make the request upon eviction of a cache line 212 that it would have written back to the L2 cache $210_{L2}$, if it had a write port to the L2 cache $210_{L2}$. In other words, the cache controller 230 may copy any cache line(s) 212i of the L3 cache $210_{L3}$ corresponding to the invalidated L1 cache line(s) 212e of the L1 cache $210_{L1}$ to the L2 cache $210_{L2}$, providing the same result as if the invalidated L1 cache line(s) 212e were written directly to the L2 cache $210_{L2}$. This may emulate a write-back path from the L1 instruction cache $210_{L1}$ to the L2 cache $210_{L2}$ or the L3 cache $210_{L3}$. Avoiding the instruction fetch increases performance, while avoiding the use of an additional write port reduces an implementation cost. When the processor 100 requests instructions (or data) from the cache 210, the cache controller 230 may service the request from the L1 cache $210_{L1}$ or the L2 cache $210_{L2}$. In some examples, the cache controller 230 copies requested cache lines 212 from the L2 cache $210_{L2}$ to the L1 cache $210_{11}$, allowing relatively faster access to that memory for future memory access requests.

Rather than initiating the L2 cache load at the time of an L1 cache miss or an L2 cache miss, the cache controller 230 may initiate the L2 cache load (i.e., loading cache line(s) 212c of the L3 cache $210_{L3}$ corresponding to the invalidated L1 cache line(s) 212e of the L1 cache $210_{11}$ to the L2 cache $210_{L2}$) at the time of the eviction of the invalidated instruction cache line(s) 212e from the L1 cache $210_{L1}$. This allows the instruction fetch to occur relatively soon, providing improved performance.

Figure 5:
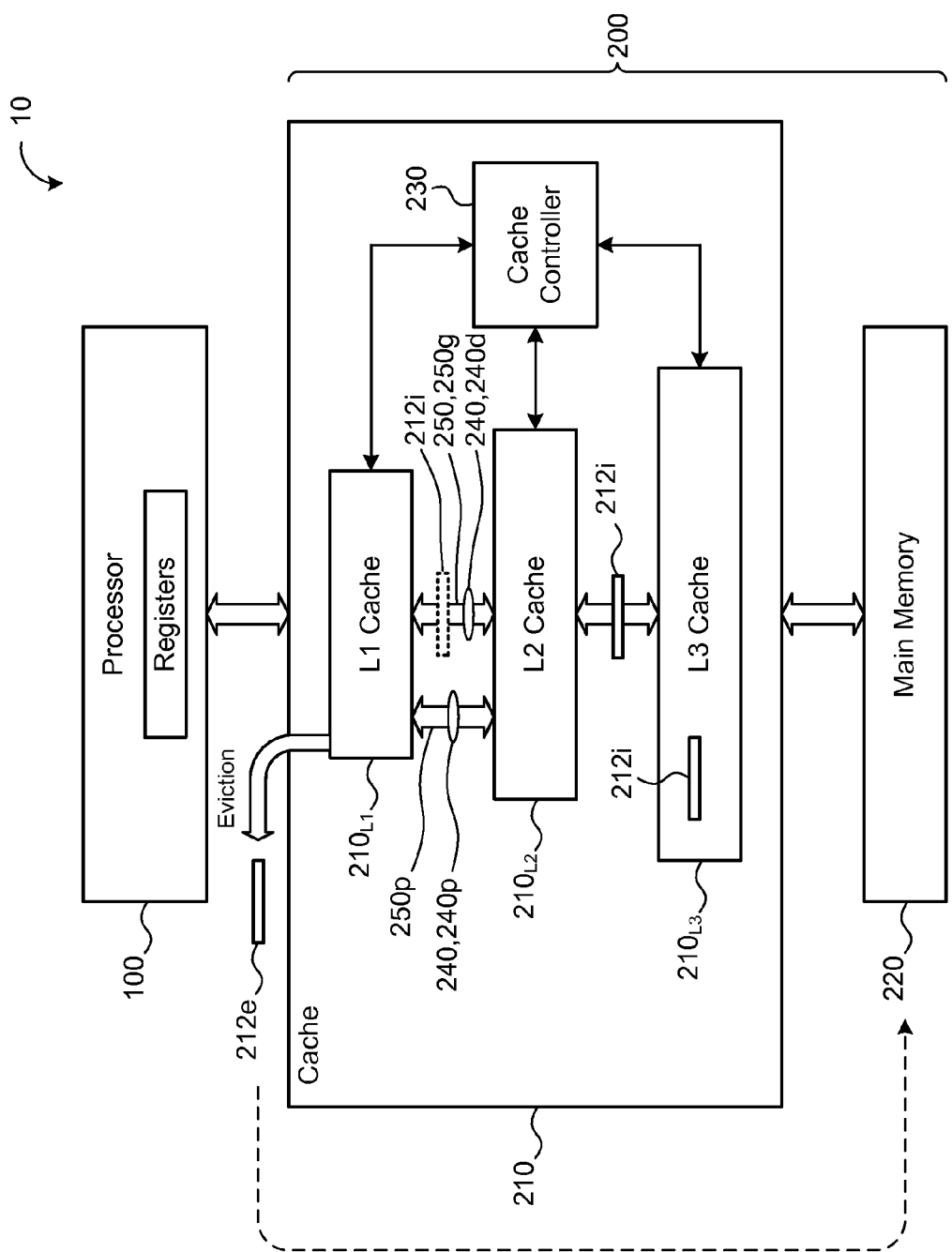
Figure 6:
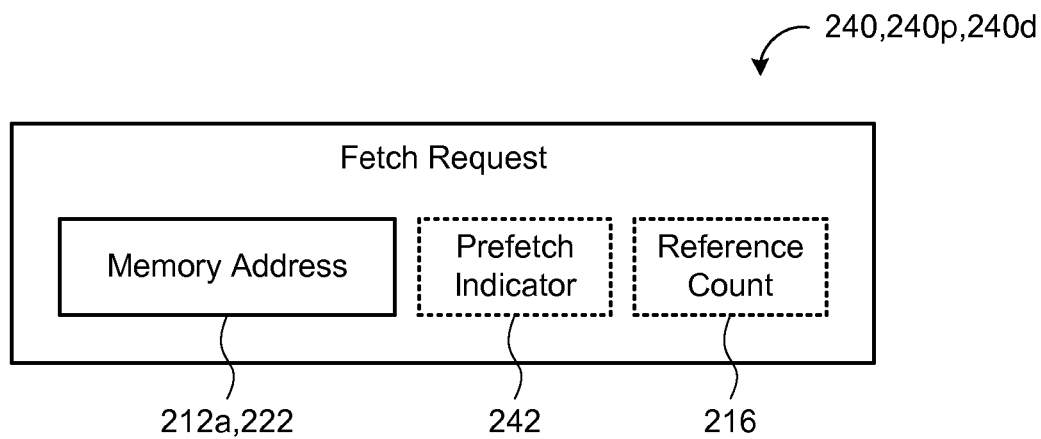
FIG. 6 is a schematic view of an exemplary fetch request.

Referring to FIGS. 4-6, in some implementations, upon invalidating a cache line 212, the L1 cache $210_{11}$ sends a fetch request 240 having an address 212a of the invalidated cache line 212 to the L2 cache $210_{L2}$ along an address request path 250 (e.g., a 42-bit bus (bits 47:6 inclusive)) between the L1 cache $210_{L1}$ and the L2 cache $210_{L2}$. In some examples, the address request path 250 is a general address request path 250g that accepts both prefetch requests 240p and demand fetch requests 240d. In this implementation, victim/prefetch entries and standard demand instruction fetch entries may share an instruction queue. Alternatively, the address request path 250 is a prefetch address request path 250p that accepts only prefetch requests 240p.

Instruction prefetch is a technique typically used in processors to speed up the execution of a program by reducing wait states. When the processor 100 is faster than the memory 200 storing instructions for execution of a program, the processor 100 can request to read the instructions faster than the memory 200 can make them available, resulting in the processor 100 waiting on the memory 200. Prefetching occurs when the processor 100 requests an instruction from the main memory 220 before it is actually needed and stores the returned instruction in the cache 210. When the instruction is actually needed, the instruction can be accessed much more quickly from the cache 210 than from the main memory 220.

When using a dedicated prefetch address request path $250p$ for sending prefetch requests $240p$, the L2 cache $210_{L2}$ knows that the received fetch request 240 is a prefetch request $240p$ and handles the request accordingly by fetching the data from the L3 cache $210_{L3}$ or memory hierarchy. The cache line(s) 212 fetched in this manner can be considered prefetches, rather than demand fetches, avoiding bandwidth consumption from any concurrently executed fetch for instructions. However, when the L2 cache $210_{L2}$ receives the prefetch requests $240p$ over the general address request path $250g$, the L2 cache $210_{L2}$ needs to discern between prefetch requests $240p$ and demand fetch requests $240d$.

In some implementations, the prefetch request $240p$ includes the address $212a$ of the invalidated cache line 212 and a prefetch indicator 242 signaling the L2 cache $210_{L2}$ to prefetch the data corresponding to the cache line address $212a$ of the prefetch request $240p$ from the L3 cache $210_{L3}$. The L1 cache $210_{L1}$ may send the prefetch request $240p$ to the L2 cache $210_{L2}$ before incurring a cache miss for the data in the L1 cache $210_{L1}$ or the L2 cache $210_{L2}$ (e.g., upon eviction of the corresponding cache line 212 from the L1 cache $210_{L1}$ or sometime soon thereafter).

In some examples, the prefetch is part of a complex branch prediction algorithm where the processor 100 tries to anticipate the result of a calculation and fetches the right instructions in advance. The processor 100 may buffer prefetch requests to avoid delaying demand requests initiated by branch prediction.

The L1 cache $210_{L1}$ may send a prefetch request $240p$ having a memory address $212a$, 222 of either a current cache line 212 or of an invalidated cache line $212e$ to the L2 cache $210_{L2}$ based on a usage predictor, such as a reference count 218. Reference counting is a technique of storing the number of references, pointers, or handles to a resource such as a block of memory. In some examples, the L1 cache $210_{L1}$ sends the prefetch request $240p$ to the L2 cache $210_{L2}$ only when the invalidated cache line $212e$ has a reference count 218 greater than a threshold count (e.g., a certain number of accesses within a certain period of time). Additionally or alternatively, the L1 cache $210_{L1}$ may include the reference count 218 in the prefetch request $240p$ to the L2 cache $210_{L2}$ so as to pass along a usage indicator of the invalidated cache line $212e$. The L2 cache $210_{L2}$ may use the received reference count 218 for determining its own prefetches, evictions, and/or other operations.

Figure 7:
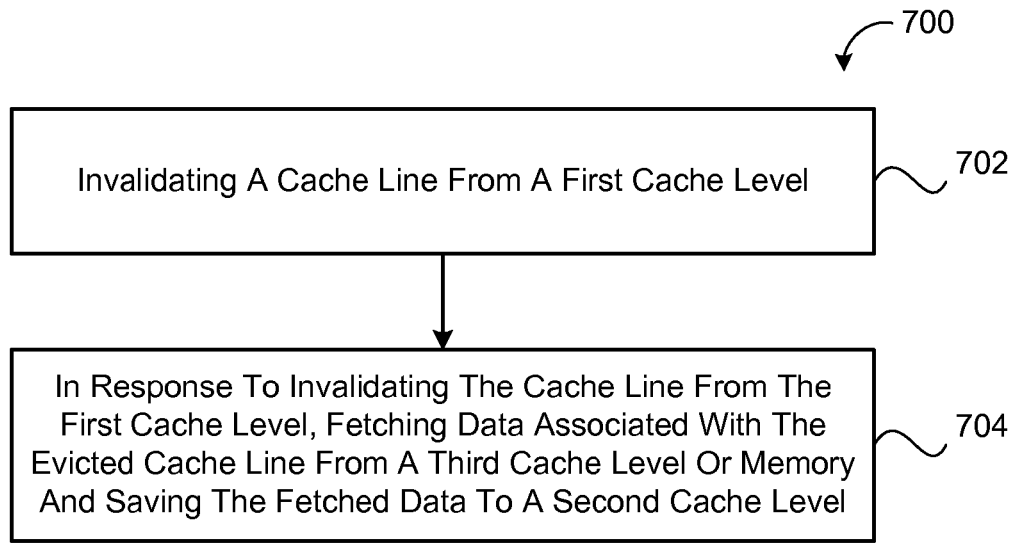
FIG. 7 provides an exemplary arrangement of operations for a method of managing processor cache.

FIG. 7 provides an exemplary arrangement 700 of operations for a method of managing processor cache 210. The method includes invalidating a cache line 212 from a first cache level (L1 cache 2100 and in response to invalidating the cache line 212 from the first cache level (L1 cache $210_{L1}$), fetching data 224 associated with the invalidated cache line 212 from a third cache level (L3 cache $210_{L3}$) or memory hierarchy (main memory 220) and writing the fetched data 224 to a second cache level (L2 cache $210_{L2}$). The third cache level (L3 cache $210_{L3}$) is larger or differently associative than the second cache level (L2 cache $210_{L2}$) and the second cache level (L2 cache $210_{L2}$) is larger or differently associative than the first cache level (L1 cache $210_{L1}$).

The method repopulates cache lines 212 in the L2 cache $210_{L2}$ without the need to build a full eviction path from the L1 cache $210_{L1}$ to the L2 cache $210_{L2}$. In other words, the method can replace a traditional L1 cache eviction to the L2 cache $210_{L2}$, which uses a write port to the L2 cache $210_{L2}$.

The method may include sending a prefetch request $240p$ having an address $212a$ of the invalidated cache line 212 from the first cache level $210_{L1}$ to the second cache level $210_{L2}$ along an address request path 250, such as a general address request path $250g$ or a separate prefetch address request path $250p$. The general address request path $250g$ accepts both prefetch requests $240p$ and demand fetch requests $240d$, whereas the prefetch address request path $250p$ only accepts prefetch requests $240p$ (i.e., prohibits demand fetch requests $240d$ from the first cache level $210_{L1}$). The method may include instantiating the prefetch address request path $250p$ between the first and second cache levels $210_{L1}$, $210_{L2}$. The second cache level $210_{L2}$ prefetches the data 224 corresponding to the cache line address $212a$ from the third cache level $210_{L3}$ or memory 220. The method may include executing the data fetch before incurring a cache miss for the data 224 in the first or second cache levels $210_{L1}$, $210_{L2}$ (e.g., by executing data fetch upon or soon after eviction of the cache line).

The prefetch request $240p$ may include the address $212a$, 222 and a prefetch indicator 242 signaling the second cache level $210_{L2}$ to prefetch the data corresponding to the cache line address $212a$ of the prefetch request $240p$ from the third cache level $210_{L3}$ or memory 220. The method may include executing the data fetch from the third cache level $210_{L3}$ or memory 220 based on a usage predictor, such as a reference count 218. In some examples, execution of the data fetch occurs only when the invalidated cache line 212 has a reference count 218 greater than a threshold count.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of managing processor caches, the method comprising:
   invalidating a cache line from a first cache level, the first cache level incapable of directly writing any cache lines back to a second cache level; and
   in response to the cache line invalidation:
      sending a prefetch request from the first cache level to the second cache level along an address request path between the first cache level and the second cache level before incurring a cache miss for data in the first cache level and the second cache level, the prefetch request having a cache line address of the invalidated cache line and the data corresponding to the cache line address of the invalidated cache line;
      prefetching the data corresponding to the cache line address of the invalidated cache line from a third cache level or memory; and
      writing the prefetched data to the second cache level;
   wherein the third cache level is larger or differently associative than the second cache level and the second cache level is larger or differently associative than the first cache level.

2. The method of claim 1, wherein the address request path between the first and second cache levels comprises a prefetch address request path and the second cache level prefetches the data corresponding to the cache line address from the third cache level or memory, the second cache level prohibiting demand fetch requests from the first cache level along the prefetch address request path.

3. The method of claim 2, further comprising sending demand fetch requests from the first cache level to the second cache level along a demand address request path, the demand address request path separate from the prefetch address request path.

4. The method of claim 2, further comprising instantiating the prefetch address request path between the first and second cache levels.

5. The method of claim 1, wherein the address request path between the first and second cache levels comprises a general address request path accepting both prefetch requests and demand fetch requests.

6. The method of claim 5, wherein the prefetch request comprises the cache line address and a prefetch indicator signaling the second cache level to prefetch the data corresponding to the cache line address of the prefetch request from the third cache level or memory.

7. The method of claim 1, further comprising executing the data prefetch corresponding to the cache line address of the invalidated cache line from the third cache level or memory before incurring a cache miss for the data in the first cache level or the second cache level.

8. The method of claim 1, further comprising executing the data prefetch corresponding to the cache line address of the invalidated cache line from the third cache level or memory based on a usage predictor.

9. The method of claim 8, further comprising prefetching data associated with the invalidated cache line from the third cache level or memory only when the invalidated cache line has a reference count greater than a threshold count.

10. The method of claim 9, further comprising sending the prefetch request to the second cache level along an address request path between the first and second cache levels, the prefetch request comprising the reference count of the invalidated cache line.

11. A computing system comprising:
    a computing processor;
    cache in communication with the computing processor, the cache comprising:
       a first cache level;
       a second cache level; and
       a third cache level,
          wherein the third cache level is larger or differently associative than the second cache level and the second cache level is larger or differently associative than the first cache level; and
    memory in communication with the cache and the computing processor,
    wherein in response to the first cache level invalidating a cache line, the first cache level configured to send a prefetch request from the first cache level to the second cache level along an address request path between the first cache level and the second cache level before incurring a cache miss for data in the first cache level and the second cache level, the prefetch request having a cache line address of the invalidated cache line and the data corresponding to the cache line address of the invalidated cache line,
    wherein in response to the second cache level receiving the prefetch request from the first cache level, the second cache level prefetching the data corresponding to the cache line address of the invalidated cache line from the third cache level of the cache or the memory and writing the prefetched data to the second cache level, and
    wherein the first cache level is incapable of directly writing any cache lines back to the second cache level.

12. The computer system of claim 11, wherein the address request path between the first and second cache levels comprises a prefetch address request path and the second cache level prefetches the data corresponding to the cache line address from the third cache level or memory, the second cache level prohibiting demand fetch requests from the first cache level along the prefetch address request path.

13. The computer system of claim 12, wherein the first cache level sends demand fetch requests to the second cache level along a demand address request path, the demand address request path separate from the prefetch address request path.

14. The computer system of claim 12, wherein the first cache level instantiates the prefetch address request path between the first and second cache levels.

15. The computer system of claim 11, wherein the address request path between the first and second cache levels comprises a general address request path accepting both prefetch requests and demand fetch requests.

16. The computer system of claim 15, wherein the prefetch request comprises the cache line address and a prefetch indicator signaling the second cache level to prefetch the data corresponding to the cache line address of the prefetch request from the third cache level or memory.

17. The computer system of claim 15, wherein the first cache level sends the prefetch request to the second cache level before incurring a cache miss for the data in the first cache level or the second cache level.

18. The computer system of claim 11, wherein the first cache level sends the prefetch request to the second cache level based on a usage predictor.

19. The computer system of claim 18, wherein the first cache level sends the prefetch request to the second cache level only when the invalidated cache line has a reference count greater than a threshold count.

20. The computer system of claim 19, wherein the first cache level sends the prefetch request to the second cache level along an address request path between the first and second cache levels, the prefetch request comprising the reference count of the invalidated cache line.

21. A computer program product encoded on a non-transitory computer readable storage medium comprising instructions that when executed by a data processing apparatus cause the data processing apparatus to perform operations comprising:
  invalidating a cache line from a first cache level, the first cache level incapable of directly writing any cache lines back to a second cache level; and
  in response to the cache line eviction:
    sending a prefetch request from the first cache level to the second cache level along an address request path between the first cache level and the second cache level before incurring a cache miss for data in the first cache level and the second cache level, the prefetch request having a cache line address of the invalidated cache line and the data corresponding to the cache line address of the invalidated cache line;
    prefetching the data corresponding to the cache line address of the invalidated cache line from a third cache level or memory; and
    writing the prefetched data to the second cache level;
  wherein the third cache level is larger or differently associative than the second cache level and the second cache level is larger or differently associative than the first cache level.

22. The computer program product of claim 21, wherein the address request path between the first and second cache levels comprises a prefetch address request path and the second cache level prefetches the data corresponding to the cache line address from the third cache level or memory, the second cache level prohibiting demand fetch requests from the first cache level along the prefetch address request path.

23. The computer program product of claim 22, wherein the operations further comprise sending demand fetch requests from the first cache level to the second cache level along a demand address request path, the demand address request path separate from the prefetch address request path.

24. The computer program product of claim 22, wherein the operations further comprise instantiating the prefetch address request path between the first and second cache levels.

25. The computer program product of claim 21, wherein the address request path between the first and second cache levels comprises a general address request path accepting both prefetch requests and demand fetch requests.

26. The computer program product of claim 25, wherein the prefetch request comprises the cache line address and a prefetch indicator signaling the second cache level to prefetch the data corresponding to the cache line address of the prefetch request from the third cache level or memory.

27. The computer program product of claim 21, wherein the operations further comprise executing the data prefetch corresponding to the cache line address of the invalidated cache line from the third cache level or memory before incurring a cache miss for the data in the first cache level or the second cache level.

28. The computer program product of claim 21, wherein the operations further comprise executing the data prefetch corresponding to the cache line address of the invalidated cache line from the third cache level or memory based on a usage predictor.

29. The computer program product of claim 28, wherein the operations further comprise prefetching data associated with the invalidated cache line from the third cache level or memory only when the invalidated cache line has a reference count greater than a threshold count.

30. The computer program product of claim 29, wherein the operations further comprise sending the prefetch request to the second cache level along an address request path between the first and second cache levels, the prefetch request comprising the reference count of the invalidated cache line.

* * * * *